United States Patent

MacKay

[15] 3,692,291
[45] Sept. 19, 1972

[54] SILVER RECOVERY

[72] Inventor: Michael T. MacKay, 2489 E. Creek Rd., Sandy, Utah 84070

[22] Filed: Aug. 26, 1970

[21] Appl. No.: 67,111

[52] U.S. Cl....................................266/22, 75/109
[51] Int. Cl.............................................C22b 61/00
[58] Field of Search......................75/107–109, 118; 266/22

[56] References Cited

UNITED STATES PATENTS

| | | | |
|---|---|---|---|
| 724,076 | 3/1903 | De Algugaray et al. | 266/22 |
| 743,551 | 11/1903 | Ogden | 266/22 |
| 2,712,931 | 7/1955 | Maddock | 266/22 |
| 2,905,323 | 9/1959 | Megesi | 75/109 |
| 3,113,169 | 12/1963 | O'Brien | 266/22 |
| 3,369,801 | 2/1968 | Hartman | 266/22 |

*Primary Examiner*—Gerald A. Dost
*Attorney*—Lynn G. Foster

[57] ABSTRACT

Equipment and methods for recovering silver from a silver-containing solution. The equipment comprises a plastic container and spaced connectors comprising an influent liquid passage and an effluent liquid passage. The connectors penetrate a lid which is sealed about the opening of the container in press-fit relation, with a sealant compound being disposed between the lid and container adjacent the press-fit. Elastomeric grommets, carried in apertures on the lid, create a seal and slip-fit with each of the two spaced connectors. A recovery element made of metal above silver in the electromotive force series fits within the container. The metal-forming the element is arranged in a woven matrix, such as, for example, galvanized window screen, which is wound about itself around its longitudinal axis which is common with the axis of the container to form a hollow cylinder having an inside surface and an outside surface and which is pervious only transversely in respect to the container. One of the passages is in liquid communication with the inside surface of the element, and the other passage is in liquid communication with the outside surface of the element. The solution precipitates silver in exchange for the metal of the woven matrix.

7 Claims, 3 Drawing Figures

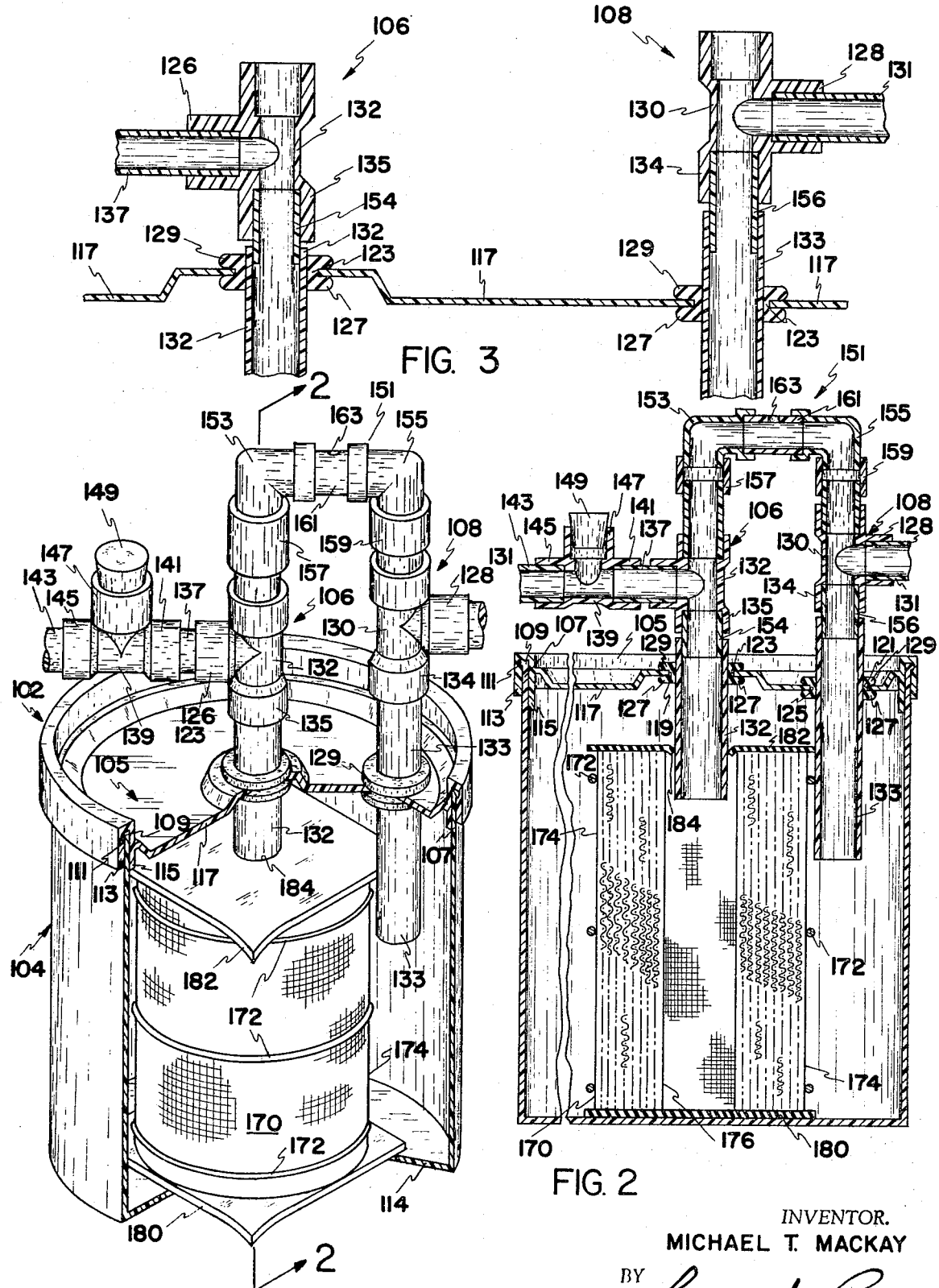
PATENTED SEP 19 1972
3,692,291
INVENTOR.
MICHAEL T. MACKAY

SILVER RECOVERY

BACKGROUND

1. Field of Invention

This invention relates generally to silver recovery and more particularly to a silver recovery unit having an improved structure comprising a plastic container and sealed lid through which are slip-fit spaced influent and effluent conduits.

2. Prior Art

Various silver salts used in photographic paper and film when fixed by various fixatives produce a complex silver salt which is dissolved or suspended in solution. As the fixatives become depleted, it is necessary that they be replaced to keep the fixing solution at a satisfactory strength if uniform and acceptable results are to be obtained. This replenishment is often accomplished on a continuing basis by the addition of a given volume of concentrated solution of fixatives to the fixing bath, while at the same time an equivalent volume of spent solution is withdrawn.

A technique for recovering silver from such spent solutions has been developed. The technique requires the passing of solutions containing silver salts through packed steel wool or small cut pieces of galvanized window screen. The steel wool and pieces of screen are anodic to silver so that a chemical replacement action will occur, which causes precipitation and deposition of the silver as the steel wool or pieces of screen dissolve. The disadvantage of packed steel wool has been its lack of resistance to corrosion caused by the fixing solution. Specifically, the steel wool fibers are small in diameter and, therefore, readily dissolved by the solution. The result is that relatively large openings develop in the steel wool and the fixing solution, thereafter, flows through the openings rather than through the remaining packed steel wool fibers since the openings present less resistance to flow. The steel wool must be replaced once the existence of such openings is discovered in order to restore satisfactory efficiency to the silver recovery unit.

Also, silver recovery units of the prior art have been expensive to manufacture, use and maintain. Frequent clogging has occurred and inefficient recovery of silver experienced.

BRIEF SUMMARY AND OBJECTS OF THE INVENTION

The mentioned disadvantages of prior art silver recovery units have been substantially alleviated or overcome by the present invention, which comprises a plastic container covered by a plastic lid with sealant composition disposed therebetween, the lid presenting sealed apertures through which spaced inlet and outlet conduits are slip-fit. Solution flow passes a transversely pervious metallic core fitting axially within the container, the core substantially preventing axial flow of solution by top and bottom impervious covers. The core is preferably constructed from axially-oriented, coiled screen with small mesh openings.

The result is that silver recovery units according to the present invention are inexpensive and easy to use, and remain highly efficient until the replaceable metallic core has been fully utilized and the operation of the unit is not normally subject to interruptions due to clogging.

An emergency overflow conduit connects the influent and effluent passageways to accommodate prompt discharging of influent solution when a surge of solution or clogging of the container occurs.

It is a primary object of this invention to provide an improved silver recovery apparatus and method.

Another important object of the present invention is to provide an improved silver recovery apparatus and method wherein novel container, and closure structures are defined.

It is a further significant object of this invention to provide a silver recovery unit having an improved solution flow path defined by spaced conduits slip-fit into sealed relation with a closure.

These and other objects and features of the present invention will become more fully apparent from the following description and appended claims taken in conjunction with the accompanying drawings.

FIG. 1 is a perspective view with parts broken away for clarity of illustration of a presently preferred embodiment of this invention;

FIG. 2 is a cross sectional view taken along line 2—2 of FIG. 1; and

FIG. 3 is similar to FIG. 2 comprising an enlarged fragmentary cross section in elevation of solution influent and effluent structures of silver recovery unit of FIG. 1.

DETAILED DESCRIPTION OF THE ILLUSTRATED EMBODIMENT

General

As shown in FIGS. 1, 2 and 3, a silver recovery unit, generally designated 102, comprises a bucket or container 104, of polyethylene or other suitable chemically-inert plastic, a lid or closure 105, liquid effluent and influent connector structures 106 and 108, and a metallic core 110, which is located in generally axial relation, within the container 104 and is in liquid communication with the influent connector 108 and the effluent connector 106.

The Container and Closure

The silver recovery unit 102, as mentioned, comprises a container 104, which terminates in an elevated opening at 107 away from which projects a radial lip 109, and a dish-shaped closure or lid 105. The container 104 and lid 105 are respectively fabricated of material which is inert to the photographic solutions to be treated and are press-fit together so that the lid 105 closes the opening 107 such that the removable lip 109 fits snugly within a groove 111 disposed between two essentially coextensive, though spaced flanges 113 and 115, which comprise part of the lid or closure 105 and extend downwardly. Through experience it has been found to be important to extrude a ribbon of sealant composition (not shown) between the flanges 113 and 115 at groove 111 so that a totally impervious fluid seal is established between the container 104 and the lid 105. A suitable sealant composition comprises RTV silicone rubber sealant, manufactured by the General Electric Co., Silicone Products Department, Waterford, New York. Other acceptable sealants are also available.

The closure or lid 105 defines a plate 117 through which two apertures 119 and 121 extend. Each aperture 119 and 121 receives an elastomeric grommet 123 and 125 respectively. Each grommet 123 and 125 is press-fit into the aperture with which it is associated so that annular flanges 127 and 129 tightly grip and seal against the bottom and top surfaces of the lid wall 117. The influent connector structure 108 is slip-fit in sealed relation through the grommet 125 while the effluent connector structure 106 is in like manner slip-fit in sealed relation through the grommet 123. In each case a firm, liquid-tight seal at the aperture and connector structure is accommodated. When desired, the influent and effluent connector structures 108 and 106, when the unit 102 is not in use, can be physically pulled from he grommets 125 and 123, respectively, to accommodate, for example, removal of the lid 105 from the container 104. By the same token, the lid 105 together with the influent and effluent connector structures 108 and 106 can be unitarily removed from the container 104. With the lid or closure 105 removed, the metallic core 170, hereinafter more fully described, can be inserted or removed, and the silver sludge deposited by reason of the chemical action between the core 170 and the solution being processed can also be removed.

The Liquid Connectors

The liquid influent connector 108 comprises an influent tube 131, a vertically-oriented tee fitting 130, with the left end of the influent tube 131 press-fit and bonded within the horizontally directed port 128 of the tee 130. The lower, vertically directed port 134 of the tee receives in press-fit and preferably bonded relation a downwardly extending short tube 156. The tube 156 is in turn press-fit into the interior of the upper end of a discharge tube 133. Preferably, the inside diameter of the discharge tube 133 is slightly smaller than the outside diameter of the pipe 156 so that a snug press-fit relation is established to avoid any leakage whatever of the solution being processed. Use of a coating comprised of stop cock grease between the contiguous surfaces of tubes 156 and 133 continually accommodates relative rotation of the tubes whereby the orientation of port 128 of tee fitting 130 can be set as needed or desired without creating leakage problems. Likewise use of such stop cock grease between grommet 121 and tube 133 continually allows for easy insertion and removal of the tube 133 within and from the grommet and yet preserves a tight fluid seal when the parts are slip-fit together as illustrated. One of several suitable stop cock greases is identified as Silicone Lubricant manufactured by Dow Corning of Midland, Michigan.

The effluent connector structure 106 comprises a downwardly extending tube 132 the lower end of which is at an elevation above the lower end of tube 133, to assist in creating proper gravity flow. Tube 132 receives processed solution from the container 104 and delivers the processed solution to a short pipe 154, which is tightly press-fit in sure sealed relation into the interior of the upper end of the tube 132. The upper end of the pipe 154 is snugly received within and preferably bonded to the lower, vertically directed port 135 of a tee fitting 132. Solution being discharged normally flows from the tee through a discharge conduit 137, which is snugly fitted within and preferably bonded to the horizontally directed port 126. Use of stop cock grease between the tubes 132 and 154 accommodates relative rotation whereby the orientation of port 126 is changed as desired or necessary without creating leakage problems. Use of stop cock grease between tube 132 and grommet 123 accommodates ready insertion and removal of the tube within the grommet at any time and, when inserted, permits a fluid seal to exist whereby leakage does not occur.

If desired, the end shown at the left of the conduit 137 may be coupled to a horizontally-oriented tee fitting 139 at port 141. A conduit 143 at port 145 of the fitting 139 may be used to convey the solution to a suitable depository, with the vertically directed port 147 serving as an examination site whereby the solution being discharged can be inspected and/or tested when the plug 149 is removed.

It should be readily apparent that the material or materials from which the components of the influent connector structure 108 and the effluent connector structure 106 are made must inherently comprise plastics which are inert to the silver-containing fixing solution processed through the silver recovery unit 102.

On occasions surges of influent solution and clogging of the unit due to improper use may occur.

To prevent the back up of solution into photographic developing equipment, emergency overflow structure 151 is provided. The emergency overflow structure 151 comprises a pair of elbows 153 an 155 respectively connected by sleeves 157 and 159 to tee fittings 132 and 130. Sleeves 157 and 159 are transparent to allow the operator of the unit 102 to visually identify when flow is occurring in the emergency overflow structure 151. Use of stop cock grease between the contiguous surfaces of sleeves 157 and 159 and tee fittings 132 and 130, respectively allow for the aforesaid rotation of tee fittings 132 and 130 without inducing leakage problems. A tube 161 couples the elbows 153 and 155 one to the other in sealed relation. Thus, the joints between the components of emergency overflow structure 151 are thus firmly established to avoid fluid leakage through press-fit unions and/or use of suitable bonding substances. The material from which the components of emergency overflow structure 151 is comprised is inert to attack by the photographic solutions processed in silver recovery unit 102. The tube 161 possesses an elevated port 163, which also allows the force of gravity to operate upon the solution confined by the silver recovery unit 102.

From the foregoing it should be apparent that the ordinary flow of solution through the recovery unit 102 is by force of gravity, the outlet conduit 137 being somewhat lower than the influent conduit 131.

The Metallic Core

The metallic core 170 is transversely permeable and comprised of metal which is above silver in the electromotive force series. Although several such metals are known which will perform satisfactorily, it has been found that iron in the form of galvanized, woven screen is well suited to this use. The forming of window screen into a suitable metallic core is readily accomplished without substantial investment of labor and, when properly inserted in the container 102, causes an essentially transverse flow pattern of the solution through the screen.

The coiled screen 170 is preferably retained in the illustrated configuration by use of several belt-type fasteners 172 which form a loop about the coiled screen to retain the generally cylindrical configuration. It is convenient to place or replace the coil of metal screen within the container 104 by merely removing the closure 105 from the container 104 and situating the coiled screen in the position illustrated in FIGS. 1 and 2. Consequently, the core 170 defines an axially extending cylinder defining an outside surface 174 and an inside surface 176.

The bottom 178 of the coil rests on an impervious cover or flap 180, which prevents axial flow of solution into the coiled screen 170.

The top of the core 170 supports a horizontally oriented cover or flap 182. The flap 182 has a central opening 184, which is smaller in diameter than the outside diameter of the tube 132. Thus, a tight, frictionally restrained union is established between the opening 184 and the tube 132 which is liquid tight. This also makes the top of the core 170 essentially impervious to axial flow of solution except along the hollow of the core as discharge through tube 132 occurs, thereby forcing the transverse solution flow mentioned earlier. The extension of the influent tube 133 to a discharged point immediately adjacent the side surface 174 of the core 170 also aids in accomplishing the desired transverse solution flow through the core 170. Later, the silver-containing sludge is removed from the container 104 and reduced to elemental silver by conventional processes.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A fluid tight silver recovery unit accommodating fluid flow therethrough under force of gravity: a container comprising a bucket comprised of plastic material inert to photographic fixing solution, the bucket being closed at one end and along the length thereof and having a large opening at the other end thereof and a lid sized and shaped to close the opening of the container and comprised of plastic material inert to photographic fixing solution, said bucket and lid together presenting opposed mating male-female press-fit sealing adjacent the opening of the bucket for releasably fastening the bucket and the lid together, the lateral dimensions of each being essentially the same and substantially equal to the lateral dimensions of the bucket, a continuous ribbon of sealant composition inert to photographic fixing solution interposed between the opposed male-female sealing means, the lid receiving liquid-conducting influent and effluent means comprised of plastic material inert to photographic fixing solution for introducing and removing solution from the container and a mass of exchange metal disposed within the container.

2. A fluid tight silver recovery unit accommodating fluid flow therethrough under force of gravity: a container comprising a bucket comprised of plastic material inert to photographic fixing solution and having an opening at one end thereof and a lid sized and shaped to be compatible with the container and comprised of plastic material inert to photographic fixing solution, the bucket and lid being disposed in releasably sealed relation adjacent the bucket opening, the lid comprising two spaced apertures each receiving female fitting means of material inert to photographic fixing solution respectively sealed to the lid at the associated aperture and each female fitting means defining bore means, influent and effluent connector structures for introducing and removing solution from the container, each connector structure comprising a conduit press fit into the bore means of one female fitting means to establish a seal which conduits can be manually pulled from their press fit relation in the bore means when desired, a metallic core disposed within the container having a cylindrical configuration and an axis essentially parallel to the axis of the container, the metallic core comprising a metal higher than silver in the electromotive force series and being substantially impervious to fluid flow in the axial direction but defining a plurality of liquid flow paths essentially transverse of the axis of the metallic core, and wherein the influent connector structure terminates immediately centrally adjacent the outside cylindrical surface of the metallic core and the influent connector structure commences within a central hollow of the magnetic core.

3. A silver recovery unit as defined in claim 2 wherein the influent connector structure defines an ingress flow path having a maximum elevation greater than the maximum elevation of the egress flow path defined by the effluent connector structure.

4. A silver recovery unit as defined in claim 2 further comprising hollow emergency overflow means interconnecting the effluent and influent connector structures whereby solution in excess of that which can be received by the container when operating normally or when clogged is displaced through the emergency overflow means to the effluent connector structure.

5. A silver recovery unit as defined in claim 2 further comprising lubricant interposed between contiguous surfaces of the influent and effluent conduits and the female fitting means whereby ready insertion and removal of the conduits within the bore of each female fitting means is accomplished and when insertion is completed a fluid tight relation therebetween exists.

6. A silver recovery unit as defined in claim 2 further comprising fitting means comprising part of the effluent connector structure, the fitting means defining a through bore along which the processed solution is displaced and a port normally closed by removable closure structure whereby the effluent solution can be inspected and tested.

7. A silver recovery unit as defined in claim 4 wherein at least part of the hollow emergency overflow means comprises a transparent conduit accommodating visual observation of excess flow, if any.

* * * * *